United States Patent
Takeda et al.

(10) Patent No.: US 10,380,756 B2
(45) Date of Patent: Aug. 13, 2019

(54) VIDEO PROCESSING SYSTEM AND METHOD FOR OBJECT DETECTION IN A SEQUENCE OF IMAGE FRAMES

(71) Applicant: SONY CORPORATION, Tokyo (JP)

(72) Inventors: Hiroyuki Takeda, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 71 days.

(21) Appl. No.: 15/259,201

(22) Filed: Sep. 8, 2016

(65) Prior Publication Data

US 2018/0068431 A1 Mar. 8, 2018

(51) Int. Cl.
*G06T 7/70* (2017.01)
*G06T 7/11* (2017.01)
*G06T 7/73* (2017.01)
*G06T 7/246* (2017.01)

(52) U.S. Cl.
CPC ............. *G06T 7/70* (2017.01); *G06T 7/11* (2017.01); *G06T 7/248* (2017.01); *G06T 7/74* (2017.01); *G06T 2207/10016* (2013.01); *G06T 2207/10024* (2013.01); *G06T 2207/30196* (2013.01); *G06T 2207/30232* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 7,418,113 B2 * | 8/2008 | Porikli | G06K 9/32 348/143 |
| 8,363,908 B2 * | 1/2013 | Steinberg | G06K 9/00234 382/118 |
| 8,620,028 B2 | 12/2013 | Eaton et al. | |
| 2003/0103648 A1 * | 6/2003 | Ito | G08B 13/19602 382/103 |
| 2010/0177194 A1 * | 7/2010 | Huang | G06T 7/277 348/157 |
| 2012/0213405 A1 * | 8/2012 | Sasaki | G06K 9/00791 382/103 |
| 2014/0347475 A1 | 11/2014 | Divakaran et al. | |

(Continued)

OTHER PUBLICATIONS

Beleznai et al., "Human Tracking by Fast Mean Shift Mode Seeking," Journal of Multimedia, vol. 1, No. 1, Apr. 2006.*

(Continued)

*Primary Examiner* — Soo Shin
(74) *Attorney, Agent, or Firm* — Chip Law Group

(57) ABSTRACT

Various aspects of a video-processing system and method for object detection in a sequence of image frames are disclosed herein. The system includes an image-processing device configured to receive a first object template for an object in a first image frame that includes one or more objects. A plurality of object candidates that corresponds to the object for a second image frame are determined by use of the shape of the received first object template. One of the determined plurality of object candidates is selected as a second object template, based on one or more parameters. The received first object template is updated to the selected second object template to enable segmentation of the object in the second image frame and/or subsequent image frames.

20 Claims, 7 Drawing Sheets

(56) References Cited

U.S. PATENT DOCUMENTS

2015/0055829 A1* 2/2015 Liang ................. G06K 9/00536
382/103
2015/0310624 A1* 10/2015 Bulan ...................... G06K 9/66
382/103

OTHER PUBLICATIONS

Wang et al., "Integrating Color and Shape-Texture Features for Adaptive Real-Time Object Tracking," IEEE Transactions on Image Processing, vol. 17, No. 2, Feb. 2008.*
Beleznai et al., "Human Tracking by Fast Mean Shift Mode Seeking," Journal of Multimedia, vol. 1, No. 1, Apr. 2006 (Year: 2006).*
Wang et al., "Integrating Color and Shape-Texture Features for Adaptive Real-Time Object Tracking," IEEE Transactions on Image Processing, vol. 17, No. 2, Feb. 2008 (Year: 2008).*
C. Beleznai et al., "Human Tracking by Fast Mean Shift Mode Seeking", Journal of Multimedia, Apr. 2006, pp. 8, vol. 1, No. 1.

* cited by examiner

VIDEO PROCESSING SYSTEM AND METHOD FOR OBJECT DETECTION IN A SEQUENCE OF IMAGE FRAMES

CROSS-REFERENCE TO RELATED APPLICATIONS/INCORPORATION BY REFERENCE

None.

FIELD

Various embodiments of the disclosure relate to a system and method for image processing. More specifically, various embodiments of the disclosure relate to a video-processing system and method for object detection in a sequence of image frames.

BACKGROUND

Recent advancements in the field of video surveillance systems, machine vision systems in the field of robotics and automotive industry, and consumer electronic (CE) devices are largely due to rapid technological developments in image processing techniques. One such image processing techniques is image segmentation, which may refer to the partitioning of an image into several regions based on certain rules. Although various segmentation methods have been known to separate foreground objects from the background of an image or a video, the complexity, accuracy, and computational resource requirements vary based on the objective to be achieved.

In conventional video segmentation methods, a common approach to segment a foreground object is to subtract a pre-determined static background image from a newly captured image. The remaining pixels after subtraction may be labeled as foreground. The pre-determined static background image may be a completely static background image generated at the start of the video segmentation process. A user may capture a plurality of images of a background scene with an image capture device and take an average of the plurality of images to generate the completely static background image. Therefore, during generation of the pre-determined static background image, the user may need to assure that no moving objects (including the user) are present in the captured scene. Further, if the image capture device is displaced from its original position, the static background image may need to be generated again, which may be cumbersome. Currently, another approach to segment the foreground object is to use depth information from a depth sensor. However, because of the severe noise present in most depth sensors, the boundaries of the foreground object regions obtained that rely heavily on depth values are often not smooth. There may be some undesired holes within the foreground object regions as a result of the invalid depth values from the depth sensor.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A video processing system and method for object detection in a sequence of image frames is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
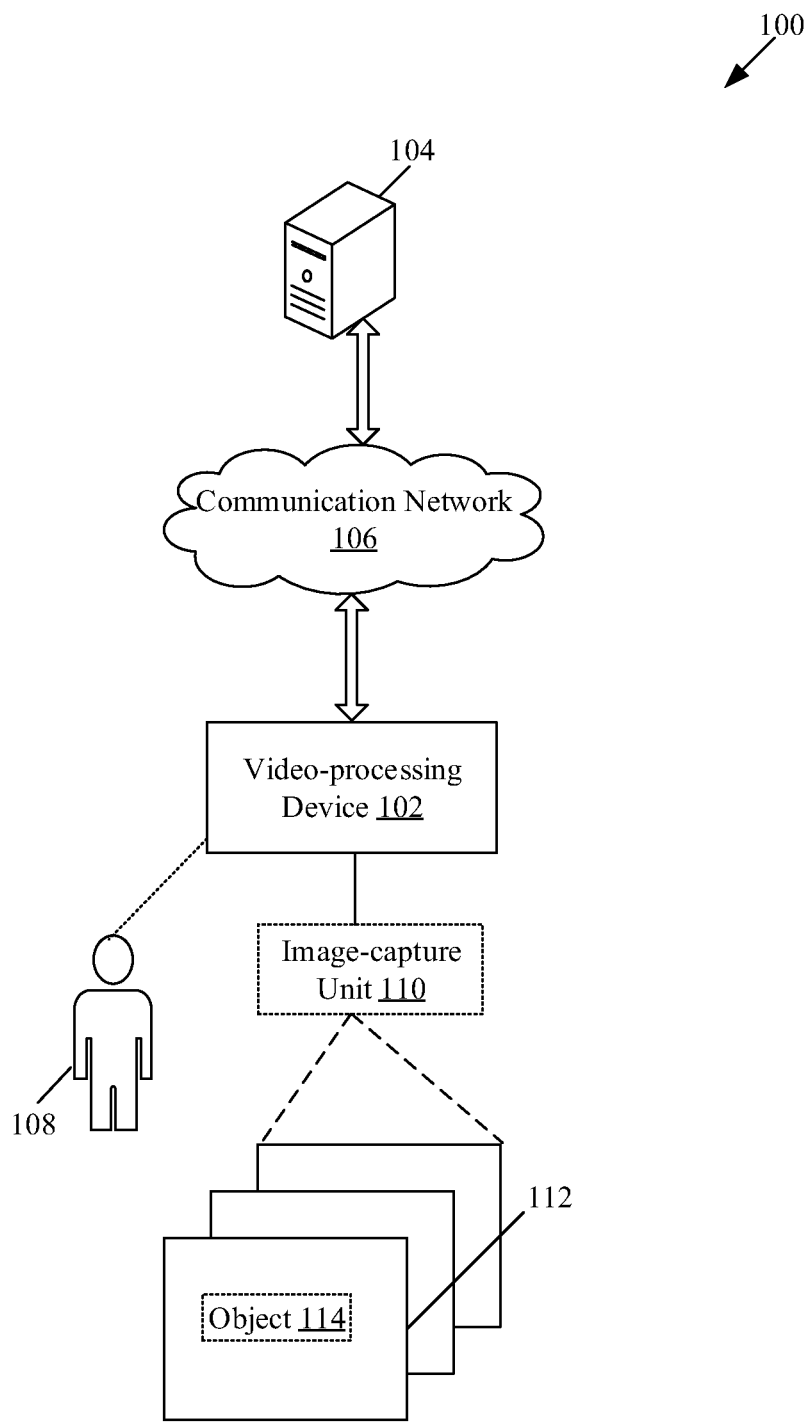
FIG. 1 is a block diagram that illustrates an exemplary network environment for object detection in a sequence of image frames, in accordance with an embodiment of the disclosure.

The following described implementations may be found in the disclosed video processing system and method for object detection in a sequence of image frames. Exemplary aspects of the disclosure may include a video-processing system that may receive a first object template for an object in a first image frame that includes one or more objects. The video-processing system may determine a plurality of object candidates for a second image frame by use of a particular shape of the received first object template. The plurality of object candidates may correspond to the object. The object may be a moving object or an object located at a same position but in a different orientation in the second image frame and/or one or more of the subsequent image frames with respect to the first image frame. The video-processing system may select one of the determined plurality of object candidates as a second object template based on one or more parameters. The one or more parameters may correspond to color values of the object within the first object template and corresponding color values of the object within the determined plurality of object candidates. The one or more parameters may further correspond to the distance of a plurality of object center coordinates of each of the determined plurality of object candidates with respect to an object center coordinate of the received first object template. The video-processing system may update the received first object template to the selected second object template to enable segmentation of the object in the second image frame and/or subsequent image frames.

The plurality of object candidates may be determined, based on a plurality of predicted positions or orientations of the object in the second image frame with respect to a current position of the object in the first image frame. The second object template may be selected from the plurality of object candidates, based on an extent of similarity of the one or more parameters between each of the determined plurality of object candidates and the first object template.

In accordance with an embodiment, the second object template may be selected from the plurality of object candidates, based on a mean-shift technique and the first object template. The video-processing system may be further configured to detect a movement and/or a direction of the movement of the object in the second image frame with respect to the first image frame. The movement and/or the direction of the movement of the object in the second image frame, with respect to the first image frame, may be detected based on a comparison of one or more components associated with the selected second object template with a first defined value. The one or more components may be derived from a result obtained through the mean-shift technique.

The video-processing system may be further configured to detect whether the object has moved in the second image frame with respect to the first image frame in the event that a horizontal motion component associated with the selected object candidate is greater than a threshold value. The video-processing system may further include an image sensing circuitry configured to capture a sequence of image frames. The captured sequence of image frames, which includes the first image frame and the second image frame, may be communicated to one or more circuits of an image-processing device for future processing.

In accordance with an embodiment, the object may be detected in the second image frame prior to the capturing of the second image frame by use of the first object template and a mean-shift technique. The first object template may be updated to the second object template while the second image frame is captured. The object may be a human body. The video-processing system may be further configured to segregate a foreground region of the first image frame. The video-processing system may estimate a plurality of foreground masks in the segregated foreground region that corresponds to the one or more objects. The plurality of foreground masks that correspond to the one or more objects in the segregated foreground region may be estimated. The estimation may be done based on a subtraction of pixel values in the background region from corresponding pixel values in the received first image frame. The first object template may be selected from the plurality of foreground masks.

In accordance with an embodiment, the first object template may be selected from the plurality of foreground masks, based on face, human body, gesture, motion, shape, and/or edge detection. The video-processing device may be further configured to dynamically segment the object detected in the second image frame and the subsequent image frames of the sequence of image frames in real time or near-real time. The segmentation of the object detected in the second image frame and the subsequent image frames may occur based on at least the update operation associated with the second image frame and the subsequent image frames.

FIG. 1 is a block diagram that illustrates an exemplary network environment for object detection in a sequence of image frames, in accordance with an embodiment of the disclosure. With reference to FIG. 1, there is shown a network environment 100. The network environment 100 may include one or more image-processing devices, such as a video-processing device 102, one or more database servers, such as a server 104, a communication network 106, and one or more users, such as a user 108. An image-capture unit 110 and a sequence of image frames 112, with an object 114 are also shown. The image-capture unit 110 may refer to an integrated camera or an external camera communicatively coupled to the video-processing device 102. The video-processing device 102 and the server 104 may be communicatively coupled to each other, via the communication network 106.

The video-processing device 102 may comprise suitable circuitry, interfaces, and/or code that may be configured to process the sequence of image frames 112 for object detection and motion detection by use of a mean-shift technique. The video-processing device 102 may be configured to dynamically segment the object 114, which may be detected in the sequence of image frames 112 in real time or near-real time. Examples of the video-processing device 102 may include, but are not limited to, a digital camera, a camcorder, a head-mounted device (HMD), a smartphone, a smart-glass, a laptop, a tablet, an augmented reality based device, a computing device, and/or other consumer electronic (CE) devices.

The server 104 may comprise suitable circuitry, interfaces, and/or code that may be configured to store the sequence of image frames 112 captured by the video-processing device 102. Examples of the server 104 may include, but are not limited to, a database server, a file server, an application server, a cloud server, a web server, or a combination thereof.

The communication network 106 may include a communication medium through which the video-processing device 102 may be communicatively coupled with the server 104. Examples of the communication network 106 may include, but are not limited to, the Internet, a cloud network, a Wireless Fidelity (Wi-Fi) network, a Local Area Network (LAN), and/or a Metropolitan Area Network (MAN). Various devices in the network environment 100 may be configured to connect to the communication network 106, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity(Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

The image-capture unit 110 may comprise suitable logic, circuitry, interfaces, and/or code that may be configured to capture the sequence of image frames 112. The image-capture unit 110 may include an image-sensing circuitry that may enable capture of the sequence of image frames 112. The image-capture unit 110 may comprise a viewfinder that may be configured to compose and/or focus a scene captured by the image-capture unit 110. The image-capture unit 110 may be configured to store the captured sequence of image frames 112 in a local buffer, a memory, and/or in the server 104.

The sequence of image frames 112 may refer to a video of a scene as viewed and captured by the user 108, by use of the image-capture unit 110. The sequence of image frames 112 may include one or more objects, such as the object 114. In accordance with an embodiment, the object 114 may be an object-of-interest to be segmented from the sequence of image frames 112. The object 114 may be a moving object, a deforming object that changes its shape over a period of time, or an object located at a same position but in a different orientation at different time instances in the captured sequence of image frames 112. Examples of the object 114 may include, but are not limited to a human object, an animal, or a non-human or inanimate object, such as a vehicle or a sports item.

In operation, the image-capture unit 110 may be configured to capture the sequence of image frames 112. The captured sequence of image frames 112 may include one or more objects, such as the object 114. The object 114 may an object located at a same position but in a different orientation or position in a second image frame with respect to a first image frame of the captured sequence of image frames 112. The video-processing device 102 may receive the sequence of image frames 112 from the image-capture unit 110.

The video-processing device 102 may be configured to segregate a foreground region and a background region in a first image frame of the captured sequence of image frames 112. The video-processing device 102 may be further configured to estimate a plurality of foreground masks in the segregated foreground region. The plurality of foreground masks in the segregated foreground region may correspond to the one or more objects, such as a human and a toy. The plurality of foreground masks may be estimated based on a subtraction of pixel values in the background region from corresponding pixel values in the first image frame. The plurality of the foreground masks may be estimated by binarizing the difference between the input (such as the first image frame), a background image (such as the segregated background region), and depth values. The binarization may refer to converting a color image to a binary image, where a pixel may have two possible values, such as black and white. Thus, binarizing the difference between the input (such as the first image frame), the background image may also refer to subtracting the difference between the input image frame and the background to obtain foreground region masks, referred to as the plurality of the foreground masks. Unlike the conventional depth-based object segmentation methods, the video-processing device 102 selectively uses the depth values from a depth sensor provided in the video-processing device 102. The video-processing device 102 selectively utilizes the depth values for certain regions, where the depth values are considered reliable.

The video-processing device 102 may be further configured to select a first object template from the plurality of foreground masks to detect and segment the object 114, such as a human body, in the second image frame and/or in the subsequent image frames. In accordance with an embodiment, the selection of the first object template from the plurality of foreground masks, may be done based on detection of face, human body, gesture, motion, shape, and/or edge. For example, in an event that the object 114 to be detected and segmented in the sequence of image frames is a human body, face detection and human body detection, or other type of recognition or detection technique may be utilized to reject the undesired foreground regions from the plurality of foreground masks. This process may provide an initial rough estimate of a candidate foreground mask, such as the human mask, from among the plurality of the foreground masks. The candidate foreground mask may be used as a template, such as the first object template, to find a similar object in a next image frame, such as the second image frame of the sequence of image frames 112.

The video-processing device 102 may be configured to receive the first object template for the object 114 in the first image frame, which may include the one or more objects. Thereafter, the video-processing device 102 may determine a plurality of object candidates that corresponds to the object 114 for the second image frame by use of a shape of the received first image template. The plurality of object candidates may be determined based on a plurality of predicted positions or orientation of the object 114 in the second image frame with respect to current position of the object 114 in the first image frame. The video-processing device 102 may be further configured to compare one or more parameters between each of the determined plurality of the object candidates and the first object template. This may be done to select a second object template from the plurality of the object candidates. The one or more parameters may include color values of the object 114 within the first object template and corresponding color values of the object 114 within the determined plurality of object candidates. The one or more parameters may also include a distance of a plurality of object center coordinates of each of the determined plurality of object candidates with respect to an object center coordinate of the received first object template.

The video-processing device 102 may be configured to select one of the plurality of object candidates as the second object template, based on the one or more parameters. The second object template may be selected from the plurality of object candidates based on an extent of similarity of the one or more parameters between each of the determined plurality of object candidates and the first object template. Alternatively stated, the selected object candidate in the second image frame may exhibit highest similarity to the object 114 of the first object template in the first image frame. The video-processing device 102 may utilize a mean-shift technique to make the operations related to the selection of the second object template from the plurality of object candidates, more robust.

The video-processing device 102 may detect whether the object 114 has moved in the second image frame, with respect to the first image frame, in an event that a horizontal motion component associated with the selected object candidate is greater than a threshold value. In accordance with an embodiment, the video-processing device 102 may be further configured to detect a movement and/or a direction of the movement of the object 114 in the second image frame with respect to the first image frame, based on comparison of one or more components associated with the selected second object template with a first defined value. The one or more components may be derived from a result obtained through the mean-shift technique. Alternatively stated, in an event that the object 114 is human, and the most similar human object is detected in the second image frame, it may then be estimated how much and in which direction the object 114 has moved from a current position in the first image frame.

In accordance with an embodiment, the object 114 may be detected in the second image frame prior to the actual capture and storage of the second image frame by use of the first object template and the mean-shift technique. For example, the user 108 may be viewing a scene to be captured via a viewfinder of an image capture unit provided in the video-processing device 102. The scene may correspond to the sequence of image frames 112 visualized through the viewfinder. The first object template may be updated to the second object template while the second image frame is captured.

In accordance with an embodiment, the video-processing device 102 may be configured to update the received first object template to the selected second object template, to enable segmentation of the object 114 in the second image frame and/or subsequent image frames. The video-processing device 102 may be further configured to dynamically segment the detected object 114 in the second image frame and the subsequent image frames of the captured sequence of image frames in real time or near real time. The dynamic segmentation of the detected object 114 in the second image frame and the subsequent image frames may be based on at least the update operation associated with the second image frame and the subsequent image frames. The video-processing device 102 may be further configured to communicate the segmented object in the second image frame and the subsequent image frames to the server 104, via communication network 106. The server 104 may be configured to store the segmented object.

In contrast to the conventional and common approach of foreground object segmentation by use of a pre-determined and completely static background image, the video-processing device 102 may not generate the completely static background image to initiate the segmentation process. The video-processing device 102 may be configured to constantly learn and/or update a nearly static background image and the depth values during the segmentation process. In this regard, the video-processing device 102 is configured to dynamically update the nearly static background image and the depth values. This relaxation from completely static to nearly static is useful because the object 114, such as a human, may not need to step out from the scene, during capture of the scene in the sequence of image frames 112. Further, even if the image-capture unit 110 is accidentally displaced from its original position, it may not affect the segmentation process.

Figure 2:
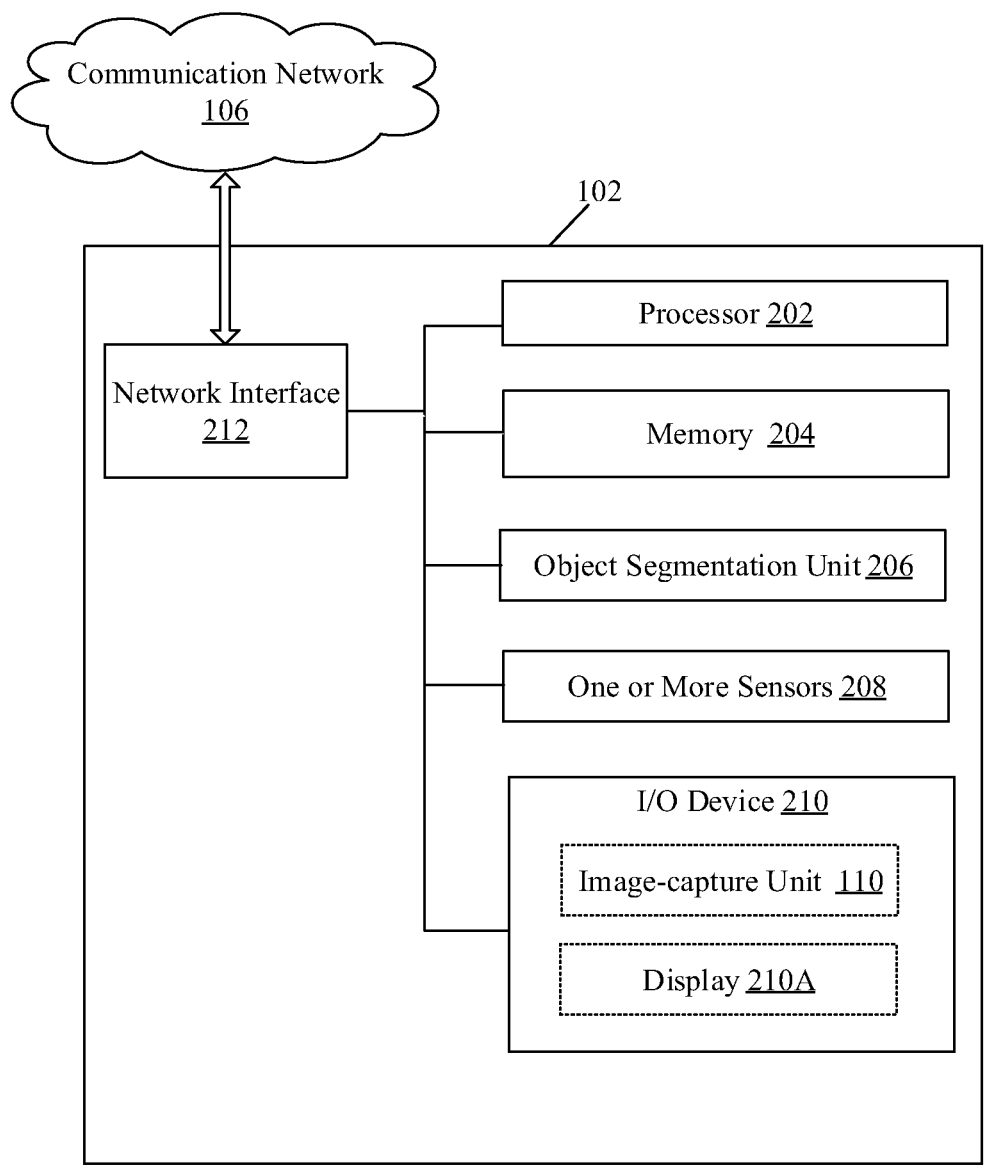
FIG. 2 is a block diagram that illustrates an exemplary image-processing device, in accordance with an embodiment of the disclosure.

FIG. 2 is a block diagram that illustrates an exemplary image-processing device, in accordance with an embodiment of the disclosure. FIG. 2 is explained in conjunction with elements from FIG. 1. With reference to FIG. 2, there is shown the video-processing device 102. The video-processing device 102 may include one or more processors, such as a processor 202, a memory 204, an object segmentation unit 206, one or more sensors 208, an I/O device 210, and a network interface 212. The image-capture unit 110 is shown as an integrated unit of the video-processing device 102, in an example. The processor 202 may be communicatively coupled with the memory 204, the object segmentation unit 206, the one or more sensors 208, the I/O device 210, the network interface 212, and the image-capture unit 110. The network interface 212 may be configured to communicate with the server 104, via communication network 106.

The processor 202 may comprise suitable logic, circuitry, interfaces, and/or code that may be configured to execute a set of instructions stored in the memory 204. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 204 may comprise suitable logic, circuitry, and/or interfaces that may be configured to store a set of instructions executable by the processor 202. The memory 204 may be configured to store operating systems and associated applications. The memory 204 may be further configured to store various algorithms to detect face, gesture, shape, and/or edge. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The object segmentation unit 206 may comprise suitable logic, circuitry, interfaces, and/or code that may be configured to segment an object, such as the object 114, in the sequence of image frames 112 in real time or in near-real time. The object segmentation unit 206 may be further configured to store the segmented object in the memory 204. The object segmentation unit 206 may be implemented as a separate processor or circuitry in the video-processing device 102. The object segmentation unit 206 and the processor 202 may be implemented as an integrated processor or a cluster of processors that perform the functions for the object segmentation unit 206 and the processor 202. The object segmentation unit 206 may be implemented as a set of instructions stored in the memory 204, which upon execution by the processor 202, may perform the functions and operations for the video-processing device 102.

The one or more sensors 208 may comprise suitable logic, circuitry, interfaces, and/or code that may be configured to perform one or more operations, such as face detection, human body detection, gesture detection, motion detection, shape detection, and/or edge detection. These operations may be performed to select the first object template from the plurality of foreground masks. The one or more sensors 208 may correspond to one or more motion sensors and/or depth sensors. Other examples of the one or more sensors 208 may include, but are not limited to an accelerometer, a global positioning system (GPS) sensor, a compass or magnometer, an ambient light sensor, a tricorder, a gyroscope, a proximity sensor, an image sensor, a lux meter, a touch sensor, and/or an infrared sensor.

The I/O device 210 may comprise suitable logic, circuitry, interfaces, and/or code that may be configured to receive an input from a user, such as the user 108. The I/O device 210 may be further configured to provide an output to the user 108. The I/O device 210 may comprise various input and output devices that may be configured to communicate with the processor 202. Examples of the input devices may include, but not limited to, a touch screen, a keyboard, a mouse, a joystick, a microphone, and/or the image-capture unit 110. Examples of the output devices may include, but not limited to, the display 210A and/or a speaker.

The display 210A may comprise suitable logic, circuitry, interfaces, and/or code that may be configured to render the sequence of image frames 112. In accordance with an embodiment, the display 210A may be able to receive input from the user 108. In such a scenario, the display 210A may be a touch screen that enables the user 108 to provide input. The touch screen may correspond to at least one of a resistive touch screen, a capacitive touch screen, or a thermal touch screen. In accordance with an embodiment, the display 210A may receive the input through a virtual keypad, a stylus, a gesture-based input, and/or a touch-based input. The display 210A may be realized through several known technologies such as, but not limited to, at least one of a Liquid Crystal Display (LCD) display, a Light Emitting Diode (LED) display, a plasma display, and/or an Organic LED (OLED) display technology, and/or other display. In accordance with an embodiment, the display 210A may refer to a display screen of smart-glass device, a see-through display, a projection-based display, an electro-chromic display, and/or a transparent display. The see-through display may be a transparent or a semi-transparent display. In accordance with an embodiment, the see-through display and/or the projection-based display may generate an optical illusion that the segmented object is floating in air at a pre-determined distance from a user's eye, such as the user 108, thereby providing an enhanced user experience.

The network interface 212 may comprise suitable logic, circuitry, interfaces, and/or code that may be configured to establish communication between the video-processing device 102 and the server 104, via the communication network 106. The network interface 212 may be implemented by use of various known technologies to support wired or wireless communication of the video-processing device 102 with the communication network 106. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 212 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS).

The functions and/or operations performed by the video-processing device 102, as described in FIG. 1, may be performed by the processor 202 and/or the object segmentation unit 206. Other operations performed by the processor 202 and the object segmentation unit 206 are further described, for example, in the FIGS. 3A, 3B, and 3C.

Figure 3A:
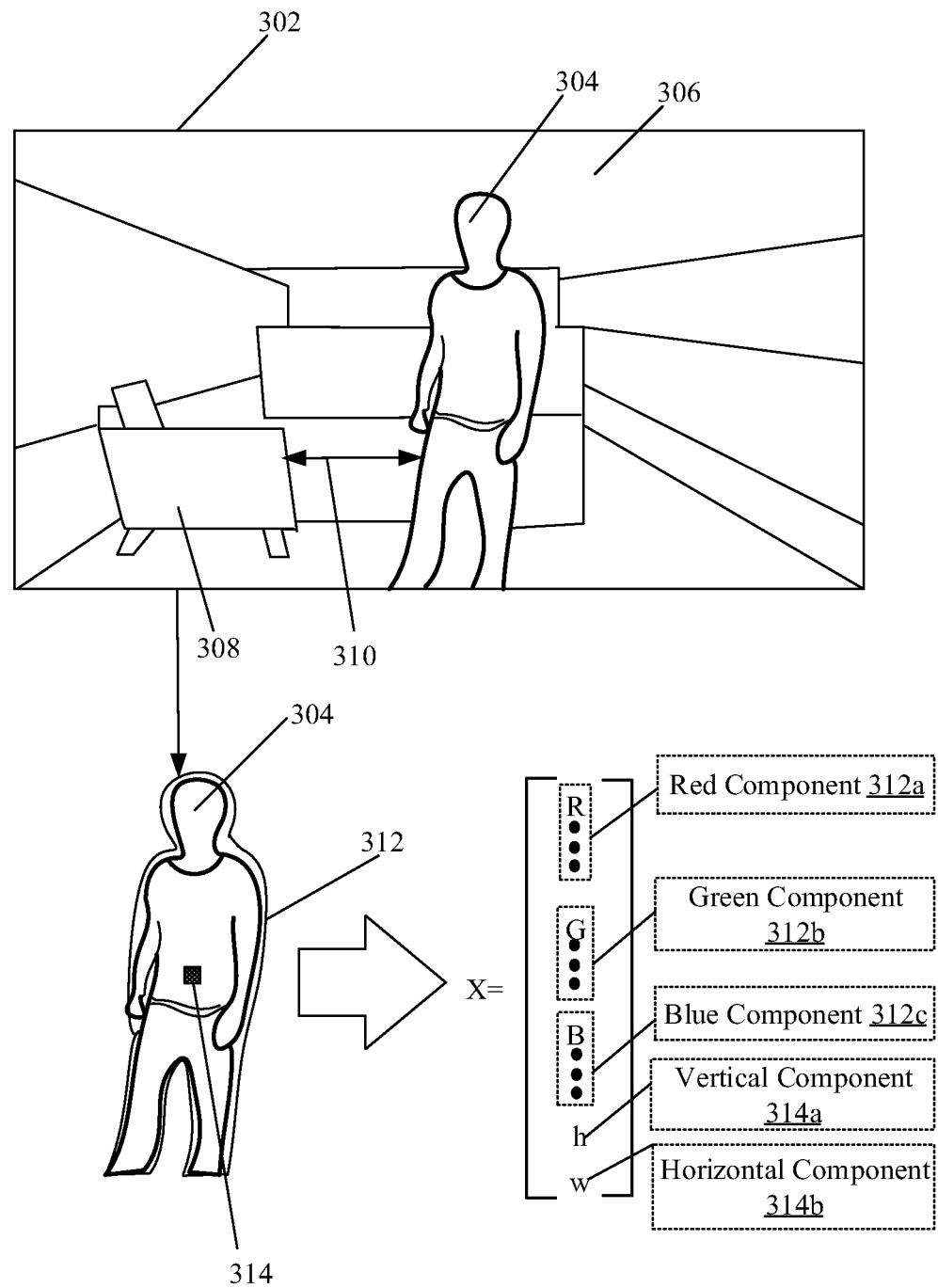
FIGS. 3A, 3B, and 3C, collectively, illustrate an exemplary scenario for implementation of the disclosed video processing system and method for object detection in a sequence of image frames, in accordance with an embodiment of the disclosure.
Figure 3B:
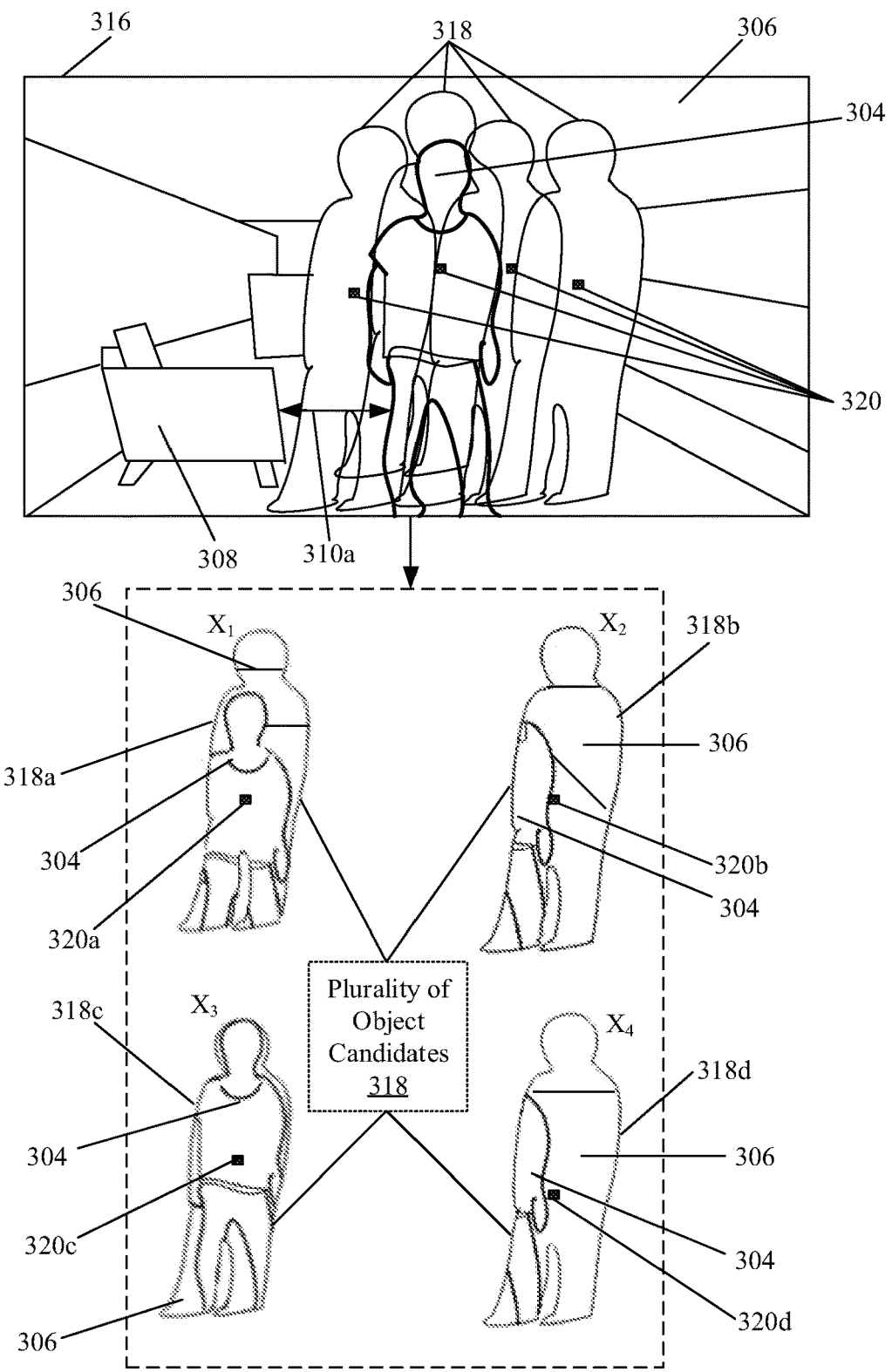
Figure 3C:
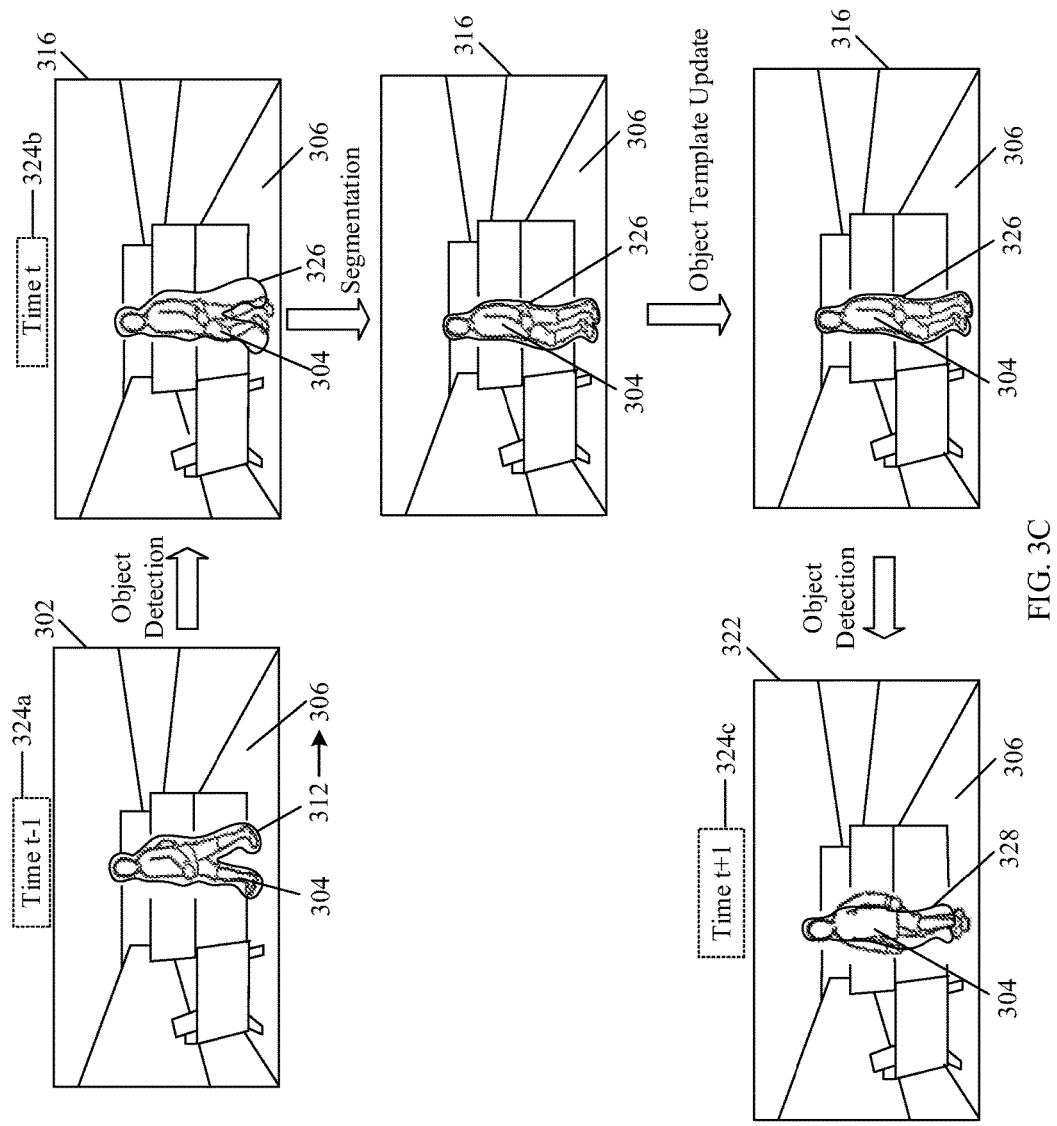

FIGS. 3A, 3B, and 3C, collectively, illustrate an exemplary scenario for object detection and segmentation in a sequence of image frames, in accordance with an embodiment of the disclosure. FIGS. 3A and 3B are described in conjunction with elements from FIGS. 1 and 2. With reference to FIG. 3A, there is shown a first image frame 302, a human object 304, a background region 306, another object, such as a sofa 308, and a first distance 310. There is also shown a first object template 312 and an object center coordinate 314 of the human object 304. A plurality of object components, such as a red component 312a, a green component 312b, a blue component 312c, a vertical component 314a, and a horizontal component 314b, are also shown.

In accordance with the first exemplary scenario, the human object 304 may correspond to the object 114 (FIG. 1). The human object 304 may be stand at a certain distance, such as the first distance 310, from the sofa 308 in the first image frame 302. The human object 304 may be a moving object. The red component 312a, the green component 312b, the blue component 312c, collectively, represent the different color values of pixels of the human object 304 within the first object template 312. The vertical component 314a may correspond to a height (h) coordinate and the horizontal component 314b may correspond to a width (w) coordinate of the first object template 312. The vertical component 314a and the horizontal component 314b may collectively represent the object center coordinate 314 of the human object 304, within the first object template 312.

In operation, a camera module, such as the image-capture unit 110 of the video-processing device 102 may capture a video, which may include the first image frame 302. The image-capture unit 110 may communicate the captured video to the video-processing device 102. In accordance with an embodiment, the processor 202 may receive an input, such as the captured video to be processed, from the image-capture unit 110. In accordance with an embodiment, the processor 202 may receive the input video to be processed from the server 104, by use of the network interface 212. Alternatively, the source of the input video, such as the sequence of image frames 112, may be pre-stored in the memory 204. Thus, it is to be understood that the source of the input video may vary. The input video may be rendered on the display 210A by the processor 202.

The processor 202 may segregate a foreground region and a background region, such as the background region 306, of the first image frame 302. The segregated foreground region in the first image frame 302 may include one or more objects, such as the human object 304. The processor 202 may estimate a plurality of foreground masks (not shown) in the segregated foreground region. The plurality of foreground masks may be estimated for the one or more objects, such as the human object 304 and/or the sofa 308. The plurality of foreground masks may be estimated based on a subtraction of pixel values in the background region from corresponding pixel values in the first image frame 302. Alternatively stated, in the event the background pixel values, such as red, green, blue and/or depth values, are available for almost entire captured scene, the generation of the plurality of the foreground mask, may be initiated. The plurality of the foreground mask may be estimated by binarizing the difference between the input, such as the first image frame 302, and a background image, such as the segregated background region, and depth values. Unlike the conventional depth-based object segmentation methods, the processor 202 may selectively utilize the depth values from the depth sensor of the one or more sensors 208 provided in the video-processing device 102. The processor 202 selectively utilizes the depth values for certain regions, where the depth values are considered reliable.

In the exemplary scenario, as the object to be detected and segmented in the input video is the human object 304, face detection and human body detection may be utilized to reject the undesired foreground regions, from the plurality of foreground masks. The object segmentation unit 206 may be configured to generate an initial rough estimate of a candidate foreground mask, such as the human mask, from among the plurality of the foreground masks. The candidate foreground mask may be estimated from the plurality of foreground masks, based on face, human body, gesture, motion, shape, and/or edge detection. The candidate foreground mask may be used as a template, such as the first object template 312, to find a similar human object in a next image frame of the input video.

The object segmentation unit 206 may be then select the first object template 312 from the plurality of foreground masks to detect and segment the human object 304 in a next image frame. Further, the object segmentation unit 206 may be configured to concurrently compute a plurality of parameters of the human object 304, within the first object template 312. The plurality of parameters may include the color values of pixels of the human object 304 within the first object template 312. The red component 312a, the green component 312b, and the blue component 312c, represent the different color values of pixels of the human object 304 within the first object template 312. The plurality of parameters may further include the vertical component 314a and the horizontal component 314b, which collectively represent the object center coordinate 314 of the human object 304, within the first object template 312. The processor 202 may be configured to store the first object template 312, and the computed plurality of parameters in the memory 204.

With reference to FIG. 3B there is shown a second image frame 316 and a plurality of object candidates 318, such as a first object candidate 318a, a second object candidate 318b, a third object candidate 318c, and a fourth object candidate 318d of the human object 304. A plurality of object center coordinates 320, such as a first object center coordinate 320a, a second object center coordinate 320b, a third object center coordinate 320c, and a fourth center coordinate 320d, and a second distance 310a, between the human object 304 and the sofa 308 in the second image frame 316, are also shown.

The object segmentation unit 206 may receive the first object template 312 of the human object 304 of the first image frame 302 from a cache memory, such as the memory 204. The object segmentation unit 206 may determine the plurality of object candidates 318 for the second image frame 316 by use of a shape of the received first object template 312. The first image frame 302 and the second image frame 316 may be a sequence of two image frames in the input video. A plurality of positions or orientations of the human object 304 in the second image frame 316 with respect to the position of the human object 304 in the first image frame 302, may be predicted. The plurality of positions or the orientations may correspond to a likelihood of occurrences of the human object 304 in certain positions or orientations in the second image frame 316 in reference to the first image frame 302. In case of the human object 304, the likelihood of a horizontal movement of the human object 304, such as running, walking, or turning, is higher than a vertical movement, such as jumping. At the time of processing of the second image frame 316, the human object 304 may not have moved far away from its original position, such as the object center coordinate 314, as detected in the first image frame 302. Thus, each of the plurality of the object candidates 318 may lie in a vicinity of the position of the human object 304, such as the object center coordinate 314, detected in the first image frame 302.

The processor 202 may then compare one or more parameters between each of the determined plurality of the object candidates 318 and the first object template 312. The one or more parameters that may be compared include the color values, such as the red component 312a, the green component 312b, the blue component 312c, of pixels of the human object 304 within the first object template 312. The color values of the human object 304, within the first object template 312, may be matched with corresponding color values of a region within the determined plurality of object candidates 318. The processor 202 may be configured to determine a distance of the plurality of object center coordinates 320 in the second image frame 316, with respect to the object center coordinate 314 of the first object template 312 in the first image frame 302.

The object segmentation unit 206 may be configured to select one of the determined plurality of object candidates 318 as a second object template, based on the one or more parameters. The second object template may be selected from the plurality of object candidates 318 based on an extent of similarity of the one or more parameters between each of the determined plurality of object candidates 318 and the first object template 312. Alternatively stated, the selected one of the determined plurality of object candidates 318 in the second image frame 316 may exhibit the highest similarity to the human object 304 of the first object template 312 in the first image frame 302. For example, the third object candidate 318c may exhibit the highest similarity to the human object 304 within the first object template 312 in the first image frame 302. The processor 202 may utilize a mean-shift technique to process operations in more robust manner related to the selection of the second object template from the plurality of object candidates.

The object segmentation unit 206 may detect whether the human object 304 has moved in the second image frame 316 with respect to the first image frame 302, in an event that a horizontal motion component "$m_h$" and "$m_w$" associated with the selected object candidate, is greater than a threshold value.

$$m(X) = \frac{\sum_{n=1}^{n} X_n K_H(X - X_n)}{\sum_{n=1}^{n} K_H(X - X_n)} - X = \begin{bmatrix} m_R \\ \vdots \\ m_G \\ \vdots \\ m_B \\ \vdots \\ m_h \\ m_w \end{bmatrix} \quad (1)$$

Where, m(X) is mean-shift vector;
X corresponds to different object components, such as the color pixel values and the object center coordinate 314, of detected object within the first object template 312 in the first image frame 302;
Xn corresponds to different object components of different object candidates from a current frame, such as the color pixel values and the plurality of object center coordinates 320 within the plurality of object candidates 318 in the second image frame 316, and where n=1, 2, 3, 4. . . . n, represents an individual candidate object;
$K_H$ corresponds to multivariate Gaussian function;
$m_R$, $m_G$, and $m_B$ correspond to color components, such as the red component 312a, the green component 312b, the blue component 312c, which represents the different color values of pixels.
$m_h$ corresponds to horizontal motion component; and
$m_w$ corresponds to vertical motion component.

In accordance with an embodiment, the object segmentation unit 206 may be configured to detect a movement and/or a direction of the movement of the human object 304 in the second image frame 316, with respect to the first image frame 302, by use of the equation (1). The one or more components, such as the color components $m_R$, $m_G$, and $m_B$ and the motion components $m_h$ and $m_w$ may be derived from a result obtained through the mean-shift technique, by use of the equation (1). Alternatively stated, once the most similar human object 304 is detected in the second image frame 316, how much and in which direction the human object 304 has moved from a current position in the first image frame 302 may efficiently be estimated. The horizontal motion component $m_h$ and the vertical motion component $m_w$ represents estimated motion vectors of the human object 304. The estimated motion vectors may indicate the location of the human object 304 in the current frame, such as the second image frame 316. The movement of the human object 304 may be detected in an event that the horizontal motion component $m_h$ is greater than or equal to a defined number of pixels, such as four pixels. In the event that the human object 304 is moving, the object segmentation unit 206 may update the static background image and depth with less errors as the object segmentation unit 206 may utilize a weak foreground/background detector by use of a Kalman filter.

With reference to both the FIG. 3A and 3B, the movement of the human object 304 in the first image frame 302 and the second image frame 316 may be comparatively observed from the first distance 310 and the second distance 310a. The human object 304 may be observed to have moved closer to the sofa 308 at the second distance 310a in the second image frame 316 as compared to the first distance 310. As shown in this case, the human object 304 occupies a larger area and is a better match to the third object candidate 318c. Thus, the third object candidate 318c may exhibit the highest similarity to the human object 304, within the first object template 312 in the first image frame 302, based on a result of the comparison of the one or more parameters, as explained, in the two image frames 302 and 316. Consequently, the object segmentation unit 206 may be configured to select the third object candidate 318c (such as one of the determined plurality of object candidates 318) as the second object template, based on the result of the comparison on the one or more parameters, by use of the equation (1).

The object segmentation unit 206 may update the received first object template 312 to the selected second object template to enable segmentation and tracking of the human object 304 in the second image frame 316. The third object candidate 318c may be used as a template for object detection and further tracking by generation of another plurality of object candidates for a subsequent image frame in a similar process, as described for the second image frame 316. Thus, once the segmentation process is started, the object segmentation unit 206 may be configured to constantly learn and/or update an object template, which is utilized for automatic segmentation of an object, such as the human object 304, from the background of the input video. The object segmentation unit 206 may be configured to dynamically segment the detected human object 304 in the second image frame 316 and the subsequent image frames of the input video in real time or near real time. The dynamical segmentation of the detected human object 304 in the second image frame 316 and the subsequent image frames may be based on at least the continuous update operation of the object template, such as from the first object template 312 to the second object template.

FIG. 3C illustrates an object detection and segmentation phase in an alternative manner in the input video, such as the first image frame 302, the second image frame 316, and a third image frame 322, in accordance with an embodiment of the disclosure. FIG. 3C is described in conjunction with elements from FIGS. 1, 2, 3A, and 3B. With reference to FIG. 3C, there is shown the human object 304, the background region 306, and the first object template 312 in the first image frame 302 at a first time instant 324a (also represented as time t-1). There is also shown detection of the human object 304 in the second image frame 316, by use one of the plurality of object candidates 318, such as a second object template 326 at a second time instant 324b (also represented as time t). The second object template 326 corresponds to the third object candidate 318c, used as the second object template 326 for object detection in the second image frame 316. Subsequent to the object detection, there is also shown segmentation of the human object 304 in the second image frame 316, by use of the second object template 326 at the second time instant 324b. This is followed by an object template update, where the first object template 312 is updated to the second object template 326 at the second time instant 324b, to begin further object detection phase in the third image frame 322 at a third time instant 324c. A third object template 328 is shown in the third image frame 322. Similar to the object detection phase in the second image frame 316, the third object template 328 in the third image frame 322 may be one of the other plurality of object candidates that may be generated for the third image frame 322, after receipt of the second object template 326. Thus, the object segmentation unit 206 may be configured to continuously, efficiently, and accurately detect and segment the human object 304 alternatively, from the background region 306, as shown and described.

In accordance with an embodiment, if two separate human objects are to be segmented from the input video, then two object templates may be processed in parallel in a similar manner as described for the first object template 312. However, if the two human objects are attached to each other, such as the human objects holding hands, a single template may be used that encapsulates both the human objects for the object detection and segmentation purpose, in a similar manner as described for the first object template 312.

Figure 4A:
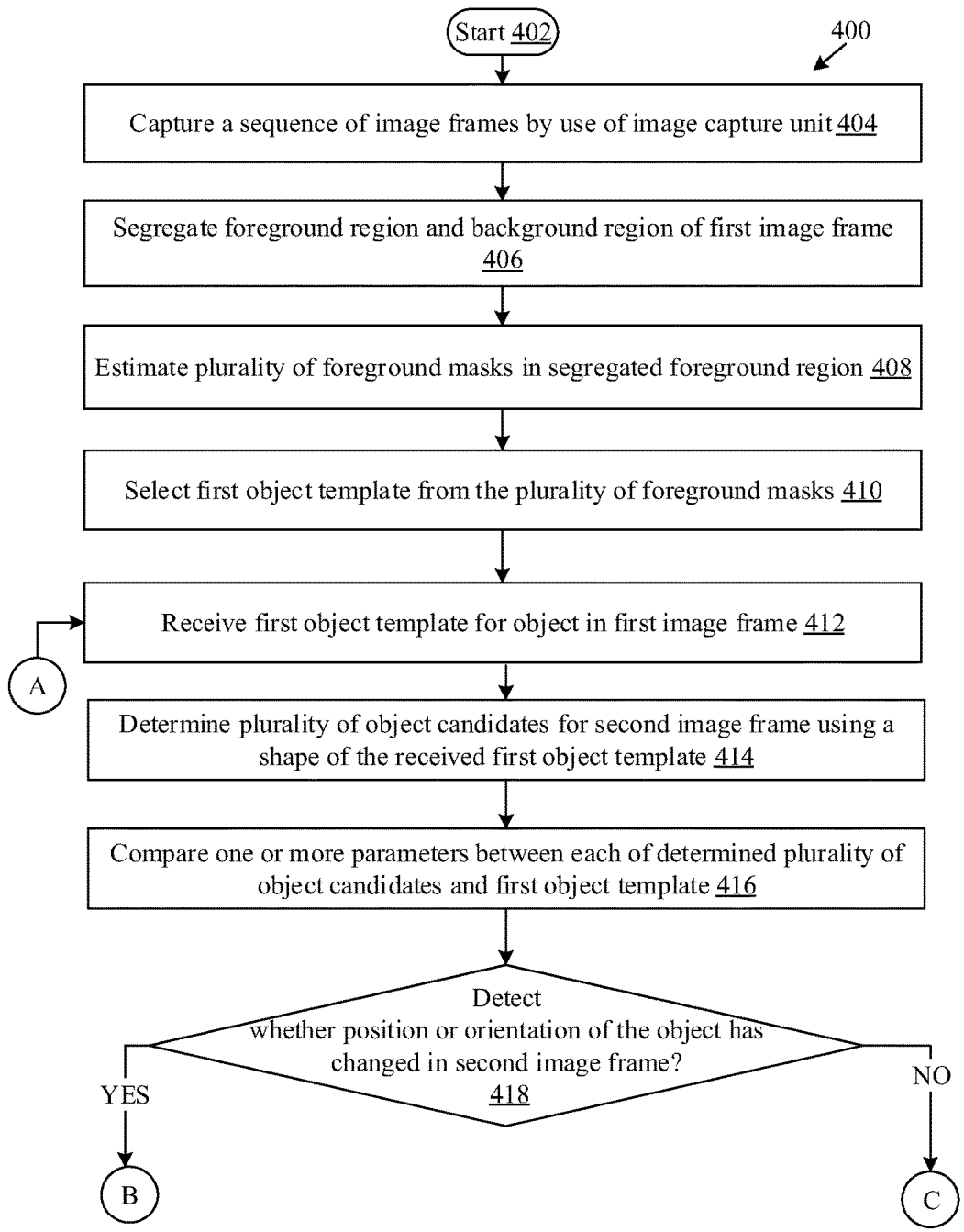
FIG. 4A and 4B, collectively, depict a flow chart that illustrates an exemplary method for object detection in a sequence of image frames, in accordance with an embodiment of the disclosure.
Figure 4B:
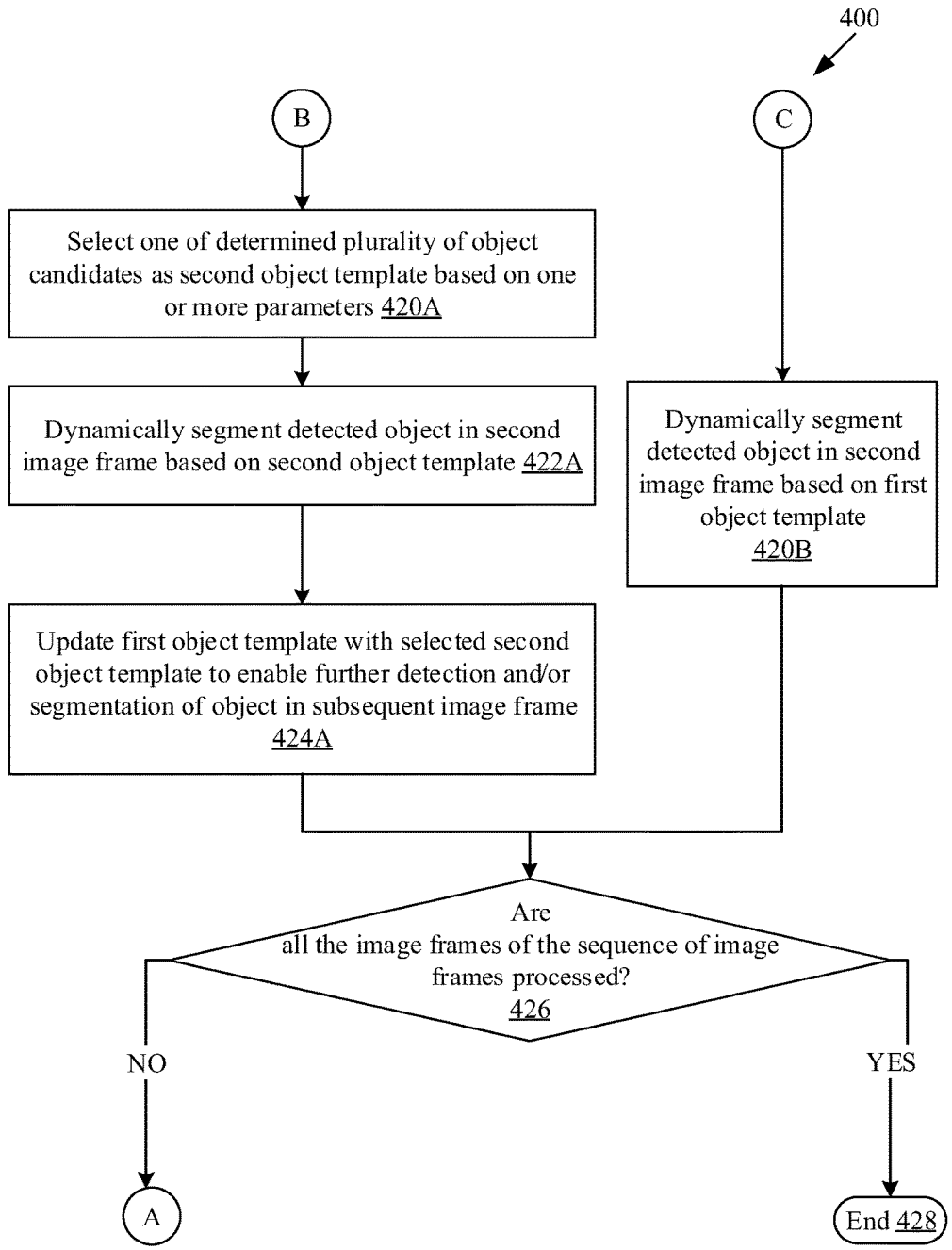

FIG. 4A and 4B, collectively, is a flow chart that illustrates an exemplary video-processing method for object detection in a sequence of image frames, in accordance with an embodiment of the disclosure. With reference to FIG. 4A and 4B, there is shown a flow chart 400. The flow chart 400 is described in conjunction with elements from FIGS. 1, 2, 3A, 3B, and 3C. The method starts at 402 and proceeds to 404.

At 404, the sequence of image frames 112, such as the input video, may be captured by use of the image-capture unit 110. The sequence of image frames 112 may include the first image frame 302, the second image frame 316, and other subsequent image frames, such as the third image frame 322 (FIG. 3C). At 406, a foreground region and a background region of the first image frame 302 may be segregated. The processor 202, may be configured to segregate the foreground region and the background region, such as the background region 306, of the first image frame 302.

At 408, a plurality of foreground masks in the segregated foreground region may be estimated. The plurality of foreground masks that corresponds to the one or more objects, such as the human object 304, may be estimated based on a subtraction of pixel values in the background region from corresponding pixel values in the received first image frame 302. The object segmentation unit 206 may be configured to estimate the plurality of foreground masks in the segregated foreground region. At 410, the first object template 312 from the plurality of foreground masks may be selected to detect the object, such as the human object 304, in the second image frame 316. The object segmentation unit 206 may be configured to select the first object template 312 from the plurality of foreground masks.

At 412, the first object template 312 for the object, such as the human object 304, in the first image frame 302 may be received. The first image frame 302 may include one or more other objects. For instance, the object segmentation unit 206 may receive the first object template 312 of the human object 304 of the first image frame 302 from a cache memory, such as the memory 204.

At 414, the plurality of object candidates 318 may be determined for the second image frame 316 by use of a shape of the received first object template 312. The object segmentation unit 206 may determine the plurality of object candidates 318 for the second image frame 316 by use of a shape of the received first object template 312. At 416, one or more parameters between each of the determined plurality of object candidates 318 and the first object template 312 may be compared. The processor 202 may be further configured to compare the one or more parameters between each of the determined plurality of object candidates 318 and the first object template 312. The one or more parameters may correspond to the color values of the object, such as the human object 304 within the first object template 312, and corresponding color values of the object, such as the human object 304, within the determined plurality of object candidates 318. The one or more parameters may further correspond to a distance of the plurality of object center coordinates 320 of each of the determined plurality of object candidates 318 with respect to the object center coordinate 314 of the received first object template 312.

At 418, it may be detected whether a position or an orientation of the object, such as the human object 304, has changed in the second image frame 316, with respect to the first image frame 302. In accordance with an embodiment, the object segmentation unit 206 may be configured to detect a movement and/or a direction of the movement of the object, such as the human object 304, in the second image frame 316, with respect to the first image frame 302, by use of the equation (1). In an event the object, such as the human object 304, is located in a different position or orientation in the second image frame 316 with respect to the first image frame 302, the control passes to 420A. Alternatively stated, once the most similar object, such as the human object 304 is detected in the second image frame 316, it may then be quickly estimated how much and in which direction the object, such as the human object 304, has moved from a current position in the first image frame 302. For example, as described in FIG. 3A, the horizontal motion component $m_h$ and the vertical motion component $m_v$ represent estimated motion vectors of the human object 304. The estimated motion vectors may indicate the location of the human object 304 in the current frame, such as the second image frame 316. The movement of the human object 304 may be detected in an event that the horizontal motion component $m_h$ is greater than or equal to a defined number of pixels, such as four pixels. Further, in an event the object, such as the human object 304, is located in same position or orientation in the second image frame 316 with respect to the first image frame 302 control passes to 420B.

At 420A, one of the determined plurality of the object candidates 318 may be selected as a second object template, based on the one or more parameters. The object segmentation unit 206 may be further configured to select one of the determined plurality of the object candidates 318 as the second object template, such as the second object template 326, based on a result of the comparison of the one or more parameters.

At 422A, the object, such as the human object 304, detected in the second image frame 316 may be dynamically segmented from the background, such as the background region 306, of the second image frame 316. The object segmentation unit 206 may be configured to dynamically segment the detected object, such as the human object 304, in the second image frame 316, based on the selected second object template, such as the second object template 326.

At 424A, the first object template 312 may be updated to the selected second object template to enable further detection and/or segmentation of the object, such as the human object 304, in a subsequent image frame. At 426, it may be checked whether all the image frames of the sequence of image frames 112 are processed. In the event that all the image frames of the sequence of image frames 112 are not processed, control may return to 404 to repeat the object detection and segmentation phase for a next image frame, such as the third image frame 322. The process may repeat unit all the sequence of the image frames 112 are processed. In the event that all the image frames of the sequence of image frames 112 are processed, the control may then pass to end 428.

At 420B, the object, such as the human object 304, detected in the second image frame 316 may be dynamically segmented from the background, such as the background region 306, of the second image frame 316, based on the first object template 312. The object segmentation by use of the first object template 312 in the second image frame 316 may occur in the event that the object, such as the human object 304, does not move or is not located in different orientation or deformed shape in the second image frame 316, with respect to the first image frame 302. The control may then pass to 426. The process may repeat unit all the sequence of the image frames 112 are processed and the control may then pass to end 428.

The disclosed video-processing system may be implemented in various application areas, such as video surveillance or tracking for moving objects, deforming objects (non-rigid deformations), or objects that change orientations at different time instances while an input video is captured. The disclosed video-processing system and method may be suited for a real-world tracking application, such as video surveillance of car tracking for autonomous navigation, a gaming system, or other real time or near-real time object detection and segmentation for such moving objects.

In contrast to the conventional and common approach of foreground object, such as the human object 304, segmentation by use of a pre-determined and completely static background image, the video-processing device 102 may not generate the completely static background image to initiate the segmentation process. The object segmentation unit 206 constantly learns or updates a nearly static background image and the depth values received from the image sensor of the one or more sensors 208 throughout the segmentation process. This relaxation from completely static to nearly static may be advantageous because the human object 304 may not need to move out from the scene, at the time of capture the scene. Further, even if the image-capture unit 110 is accidentally displaced from its original position at the time of capture of the input video, it may not affect the automatic segmentation process.

In another conventional technique of a real-time video segmentation, a color image and its depth field may be captured simultaneously. A database of human body masks may be created offline, where names of the human body parts may be labeled (such as, head, neck, shoulder, chest, arm, elbow, hand, stomach, hip, leg, knee, and foot). Further, depth information of the human body for a numerous different postures may also be captured. Every time a depth field is captured, such conventional method may scan through various local areas of the captured depth field, and check if there are any good matches for the human postures stored in the database. In an event a strong match is found, the conventional method may then roughly compute the range of depth where the human body is present. Thus, binarizing the depth field by use of the depth range information may provide a human object mask. Such conventional techniques of real-time video segmentation are depth-based methods. In contrast to such depth-based methods, the object segmentation unit 206 does not depend heavily on the depth values to segment a foreground object, such as the human object 304. Because of the severe noise present in most depth sensors, the boundaries of the foreground regions obtained relying heavily on depth values are often not smooth (not acceptable for precise object segmentation).

Another advantage of the video-processing device 102 is that the object segmentation unit 206 first determines the plurality of object candidates 318 for the second image frame 316 by use of a shape of the received first object template 312 rather than searching the first object template 312 in the entire second image frame 316. The one or more parameters, such as the color components $m_R, m_G$, and $m_B$ and the motion components $m_h$ and $m_w$, of the region within the first object template 312 may be compared with regions within the plurality of object candidates 318. Thus, the operations performed by the video-processing device 102 make the video-processing device 102 itself more robust in object detection and segmentation as compared to conventional methods of video segmentation. Further, each of the plurality of the object candidates 318 in the vicinity of the position of the human object 304, such as the object center coordinate 314, detected in the first image frame 302. In case of the human object 304, the likelihood of a horizontal movement, such as running, walking, or turning, of the human object 304 is higher than a vertical movement, such as jumping. At the time of processing of the second image frame 316, the human object 304 may not have moved far away from its original position, such as the object center coordinate 314, as detected in the first image frame 302. Thus, in case of the human object 304, the object detection is even more efficient and robust. Again, the processor 202 may utilize a mean-shift technique, such as by use of the equation (1), the operations related to the selection of the second object template from the plurality of object candidates, are also more robust. Once the most similar human object 304 is detected in the second image frame 316, the object segmentation unit 206 may efficiently estimate how much and in which direction the human object 304 has moved from a current position in the first image frame 302. In the event that the human object 304 is moving, the object segmentation unit 206 may update the static background image and depth with less errors as the object segmentation unit 206 may utilize a weak foreground/background detector by use of the Kalman filter. Thus, the object segmentation unit 206 enables the video-processing device 102 to find desired objects, such as the human object 304, and segment them out in real time or near real time in a fully-automatic manner (with no user input). The result, such as the segmented object is produced immediately after a new image of the input video is captured. Once the segmentation process is started, the object segmentation unit 206 constantly learns and updates the decision rule, such as an object template for each image frame, for segmenting out the desired objects from the background by itself.

In accordance with an embodiment of the disclosure, a video-processing system for object detection in a sequence of image frames is disclosed. The video-processing system may include the video-processing device 102 (FIG. 1), which may comprise one or more circuits (such as the processor 202 and the object segmentation unit 206 (FIG. 2)). The processor 202 may be configured to receive a first object template, such as the first object template 312, for an object, such as the human object 304, in the first image frame 302 that includes one or more objects. The object segmentation unit 206 may then determine a plurality of object candidates (such as the plurality of object candidates 318) for the second image frame 316 by use of a shape of the received first object template. The plurality of object candidates may correspond to the object. The object segmentation unit 206 may be configured to select one of the determined plurality of object candidates as a second object template, based on one or more parameters. The object segmentation unit 206 may be configured to update the received first object template to the selected second object template to enable segmentation of the object in the second image frame and/or the sequence of image frames.

Various embodiments of the disclosure may provide another non-transitory computer readable medium and/or storage medium, where there is stored therein, a set of instructions executable by a machine and/or a computer for object detection in a sequence of image frames. The set of instructions may cause the machine and/or computer to perform the steps that comprise receipt of a first object template for an object in a first image frame that includes one or more objects. A plurality of object candidates that corresponds to the object may be determined for a second image frame by use of a shape of the received first object template. One of the determined plurality of object candidates may be selected as a second object template, based on one or more parameters. The received first object template may be updated to the selected second object template to enable segmentation of the object in the second image frame and/or subsequent image frames.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A video-processing system, comprising:
   circuitry configured to:
   receive a first object template for a first object in a first image frame, wherein
   said first image frame comprises said first object and a second object, and
   said first object is at a first distance from said second object in said first image frame;

determine a plurality of object candidates corresponding to said first object, wherein
said plurality of object candidates are determined for a second image frame based on a shape of said first object template,
said first object is at a second distance from said second object in said second image frame, and
said second image frame is subsequent to said first image frame in a sequence of image frames;
select an object candidate from said plurality of object candidates as a second object template, wherein
said object candidate is selected based on at least one first object parameter, said first distance, and said second distance,
said at least one first object parameter corresponds to a third distance of a plurality of object center coordinates of said plurality of object candidates in said second image frame, with respect to a center coordinate of said first object template in said first image frame, and
said center coordinate is different from said plurality of object center coordinates;
update said first object template to said second object template; and
segment said first object in said second image frame based on said second object template.

2. The video-processing system according to claim 1, wherein
said first object is one of an orientation changing object or a deforming object, and
said deforming object changes from a first shape to a second shape over a period of time, or
said orientation changing object is located at a same position in a different orientation in said second image frame with respect to said first image frame.

3. The video-processing system according to claim 1, wherein said circuitry is further configured to determine said plurality of object candidates based on at least one of a plurality of predicted positions or a plurality of predicted orientations of said first object in said second image frame, and
wherein said plurality of predicted positions and said plurality of predicted orientations of said first object are with respect to a current position of said first object in said first image frame.

4. The video-processing system according to claim 1, wherein said at least one first object parameter further corresponds to a first plurality of color values of said first object within said first object template and a second plurality of color values of said first object within said plurality of object candidates.

5. The video-processing system according to claim 1, wherein said circuitry is further configured to select said second object template from said plurality of object candidates based on an extent of similarity of said at least one first object parameter between each of said plurality of object candidates and said first object template.

6. The video-processing system according to claim 1, wherein said circuitry is further configured to select said second object template from said plurality of object candidates based on a mean-shift technique and said first object template.

7. The video-processing system according to claim 6, wherein said circuitry is further configured to detect at least one of a movement or a direction of said movement of said first object in said second image frame with respect to said first image frame,
wherein said at least one of said movement or said direction of said movement of said first object is detected based on a comparison of at least one component associated with said second object template with a defined value, and
wherein said at least one component is derived from a result obtained based on said mean-shift technique.

8. The video-processing system according to claim 1, wherein said circuitry is further configured to detect movement of said first object in said second image frame with respect to said first image frame, and
wherein said movement is detected based on a horizontal motion component associated with said object candidate that is greater than a threshold value.

9. The video-processing system according to claim 1, further comprising: a camera configured to:
capture said sequence of image frames, wherein said sequence of image frames comprises said first image frame and said second image frame; and
communicate said sequence of image frames to said circuitry.

10. The video-processing system according to claim 1, wherein said circuitry is further configured to:
detect said first object in said second image frame prior to capture of said second image frame, wherein said first object is detected based on said first object template and a mean-shift technique; and
update said first object template to said second object template while said capture and storage of said second image frame.

11. The video-processing system according to claim 1, wherein said first object is a human body.

12. The video-processing system according to claim 1, wherein said circuitry is further configured to:
segregate a foreground region and a background region of said first image frame;
estimate a plurality of foreground masks in said foreground region,
wherein said plurality of foreground masks correspond to said first object and said second object, and
wherein said plurality of foreground masks are estimated based on a subtraction of first pixel values in said background region from corresponding second pixel values in said first image frame; and
select said first object template from said plurality of foreground masks.

13. The video-processing system according to claim 12, wherein said circuitry is further configured to select said first object template from said plurality of foreground masks based on at least one of face detection, human body detection, gesture detection, motion detection, shape detection, or edge detection.

14. The video-processing system according to claim 1, wherein
said circuitry is further configured to segment said first object detected in said second image frame and subsequent image frames subsequent to said second image frame in said sequence of image frames, and
said first object is segmented in real-time or near real-time based on said update associated with said second image frame and said subsequent image frames.

15. A method for image processing, comprising:
receiving, by circuitry in an electronic device, a first object template for a first object in a first image frame, wherein
said first image frame comprises said first object and a second object, and said first object is at a first distance from said second object in said first image frame;

determining, by said circuitry, a plurality of object candidates corresponding to said first object, wherein said plurality of object candidates are determined for a second image frame based on a shape of said first object template, wherein said first object is at a second distance from said second object in said second image frame, and said second image frame is subsequent to said first image frame in a sequence of image frames;

selecting, by said circuitry, a second object template from said determined plurality of object candidates based on at least one first object parameter, said first distance, and said second distance, wherein said at least one first object parameter corresponds to a third distance of a plurality of object center coordinates of said plurality of object candidates in said second image frame, with respect to a center coordinate of said first object template in said first image frame, and said center coordinate is different from said plurality of object center coordinates;

updating, by said circuitry, said first object template to said second object template; and segmenting, by said circuitry, said first object in said second image frame based on said second object template.

16. The method according to claim 15, further comprising determining said plurality of object candidates based on at least one of a plurality of predicted positions or a plurality of predicted orientations of said first object in said second image frame, wherein said plurality of predicted positions and said plurality of predicted orientations of said first object are with respect to a current position of said first object in said first image frame.

17. The method according to claim 15, further comprising selecting said second object template from said plurality of object candidates based on an extent of similarity of said at least one first object parameter between said plurality of object candidates and said first object template.

18. The method according to claim 15, further comprising
segmenting, by said circuitry, said first object detected in said second image frame and subsequent image frames subsequent to said second image frame in said sequence of image frames, wherein said first object is segmented in real-time or near real-time based on said update associated with said second image frame and said subsequent image frames.

19. The method according to claim 15, further comprising:

segregating, by said circuitry, a foreground region and a background region of said first image frame;

estimating, by said circuitry, a plurality of foreground masks in said foreground region, wherein
said plurality of foreground masks correspond to said first object and said second object, and
said plurality of foreground masks are estimated based on a subtraction of first pixel values in said background region from corresponding second pixel values in said first image frame; and selecting, by said circuitry, said first object template from said plurality of foreground masks.

20. A non-transitory computer-readable medium having stored thereon, computer-executed instructions, which, when executed by a processor of a video-processing device, cause said processor to execute operations, said operations comprising:

receiving a first object template for a first object in a first image frame, wherein
said first image frame comprises said first object and a second object, and
said first object is at a first distance from said second object in said first image frame;

determining a plurality of object candidates corresponding to said first object, wherein
said plurality of object candidates are determined for a second image frame based on a shape of said first object template,
said first object is at a second distance from said second object in said second image frame, and
said second image frame is subsequent to said first image frame in a sequence of image frames;

selecting a second object template from said plurality of object candidates based on at least one first object parameter, said first distance, and said second distance, wherein
said at least one first object parameter corresponds to a third distance of a plurality of object center coordinates of said plurality of object candidates in said second image frame, with respect to a center coordinate of said first object template in said first image frame, and
said center coordinate is different from said plurality of object center coordinates;

updating said received first object template to said second object template; and segmenting said first object in said second image frame based on said second object template.

* * * * *